Figure 1:
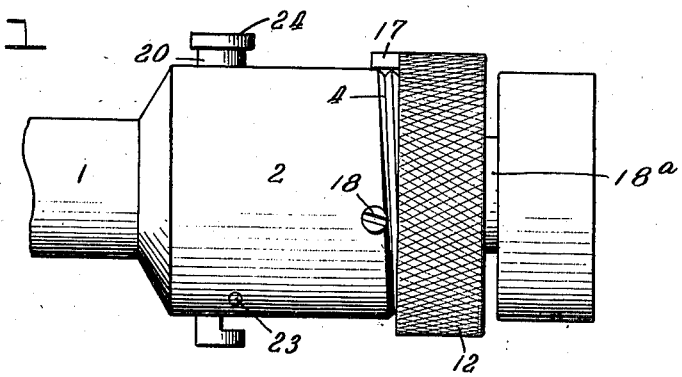

H. MUELLER & A. C. SCHUERMANN.
O. B. & A. MUELLER, EXECUTORS OF H. MUELLER, DEC'D.
TOOL RETAINING DEVICE FOR BORING BARS.
APPLICATION FILED APR. 1, 1911.

1,034,723.

Patented Aug. 6, 1912.

2 SHEETS—SHEET 1.

Witnesses
H. C. Rohnette
E. H. Bickerton

Inventors
Henry Mueller, deceased
Ora B. Mueller and Adolph Mueller, Executors
Anton C. Schuermann By Meyers, Cushman & Rea
Attorneys H. MUELLER & A. C. SCHUERMANN.
O. B. & A. MUELLER, EXECUTORS OF H. MUELLER, DEC'D.
TOOL RETAINING DEVICE FOR BORING BARS.
APPLICATION FILED APR. 1, 1911.
1,034,723.
Patented Aug. 6, 1912.
2 SHEETS—SHEET 2.
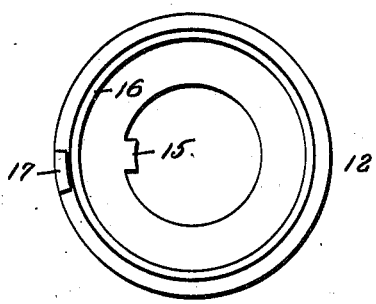
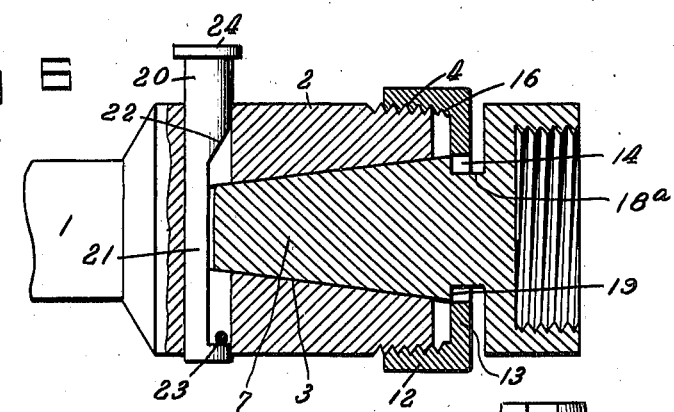
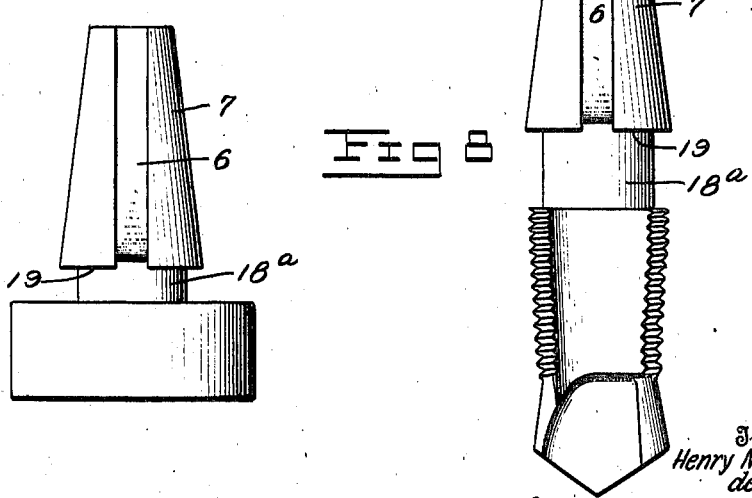
Inventors
Henry Mueller, deceased,
Ora B. Mueller & Adolph Mueller, Executors
Anton C. Schuermann

UNITED STATES PATENT OFFICE.

HENRY MUELLER, DECEASED, LATE OF DECATUR, ILLINOIS, BY ORA B. MUELLER AND ADOLPH MUELLER, EXECUTORS, AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

TOOL-RETAINING DEVICE FOR BORING-BARS.

1,034,723.

Specification of Letters Patent.   Patented Aug. 6, 1912.

Application filed April 1, 1911.   Serial No. 618,491.

*To all whom it may concern:*

Be it known that HENRY MUELLER, deceased, late a citizen of the United States and resident of Decatur, county of Macon, and State of Illinois, and ANTON C. SCHUERMANN, a citizen of the United States, and resident of Decatur, county of Macon, and State of Illinois, did during the lifetime of the said HENRY MUELLER jointly invent certain new and useful Improvements in Tool-Retaining Devices for Boring-Bars, of which the following is a specification.

Our present invention relates to certain new and useful improvements in a socket head and tool retaining device for boring bars especially designed for use in connection with tapping machines employed in tapping gas and water mains and in inserting and removing corporation cocks, and the invention also relates to a novel form of tool-shank constructed for use in connection with said socket head.

Although our improvements have been designed more especially for use in connection with tapping machines of the type referred to, we do not wish to be understood as limiting ourselves to this specific application of the invention as obviously the same may be used in connection with other types of machines.

One object of the invention is to provide means, associated with the socket head, for securely retaining the tool therein against accidental displacement and wherein the tool may be easily and quickly inserted and removed.

Another object of the invention is to provide an improved form of tool shank especially designed for use in connection with our improved socket head.

A further purpose of the invention is to provide a socket head with a novel construction and arrangement of drift pin, through the medium of which the tool may be easily and quickly released from its engagement with the socket in case the same should become too firmly seated therein to be readily removed by hand.

Other more or less important objects will appear from a reading of the following detailed description taken in connection with the accompanying drawings, wherein—

Figure 2:
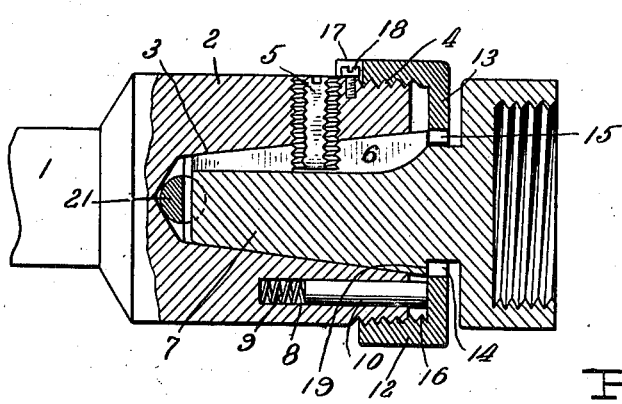
Figure 3:
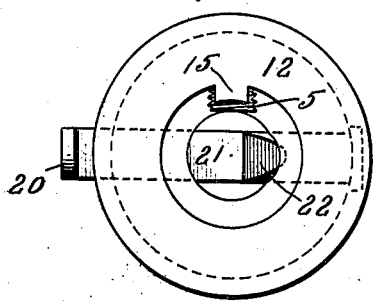
Figure 4:
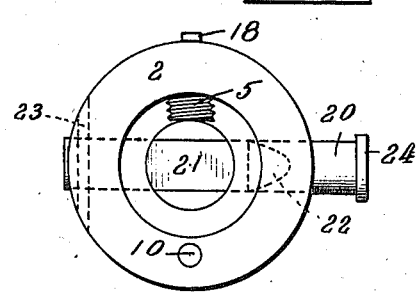

Figure 1 is a plan view of a portion of a boring-bar having associated therewith a socket head and tool retaining device constructed according to the present invention. Fig. 2 is a longitudinal section. Fig. 3 is an end view with the tool removed. Fig. 4 is an end view of the socket head with the annular tool retaining member or collar removed. Fig. 5 is a view looking into the open end of the annular tool-retaining member or collar. Fig. 6 is a longitudinal section taken at right angles to Fig. 2, and showing the drift pin and its retaining means. Fig. 7 is an elevation of one form of tool employed in inserting and removing corporation cocks. Fig. 8 is an elevation of one form of tap or drill constructed for use with our improved socket head and tool retaining device.

Referring to the drawings, the reference numeral 1, designates a boring bar which may be of any usual construction and having at one end an enlarged head 2, provided with a tool-shank receiving socket 3, which is preferably tapered as shown. The socket head 2, is externally threaded for a portion of its length, as shown at 4, and is further provided with a fixed key 5, which projects into the socket 3, said key in the instance shown, being in the form of a screw tapped into a wall of the head 2. The said key 5, is designed to engage a longitudinal groove or keyway 6, formed in the shank portion 7, of a suitable tool to hold the latter against rotation relatively to the head and which tool may be in the form of a device for removing or inserting corporation cocks, as shown in Fig. 7, or in the form of a tap or drill, as shown in Fig. 8. The said head 2, is further provided with a longitudinal bore 8, in the lower closed end of which is located a coil spring 9, which bears against a thrust pin or detent 10, for a purpose presently to be described.

The tool locking and retaining device comprises a freely rotatable annular member, shown in the present instance as being in the form of a collar 12, provided with a lateral inturned flange 13, having a central opening 14, and a tool engaging lug 15 which projects into said opening 14, the said tool engaging lug being adapted to be brought into and out of alinement with the key 5 in the bore of the head and constituting the means for retaining the tool shank within the socket 3. The outer face of the collar is preferably milled or knurled as shown in Fig. 1, in order to provide a hand-grip to facilitate turning movement thereof. The collar 12, of the annular member is internally threaded at 16, to engage the threads 4, upon the head 2, and this collar has, therefore, a rotary and a longitudinal movement upon the head 2. The collar 12, is further provided with a stop lug 17, which coöperates with a fixed stop carried by the head 2, said fixed stop in the instance shown being in the form of a screw 18. The purpose of the stops 17, and 18, is to permit a limited rotary and longitudinal movement of the tool locking and retaining member relatively to the head, the said stops preventing a complete rotation of said member upon the head, and these stops are so positioned with relation to the key 5, and locking lug 15, as to permit said lug 15, to be brought into exact alinement with the key 5, when rotated in one direction, but which lug 15 will be moved out of alinement with the key 5, when the collar is rotated in the opposite direction.

As more clearly shown in Fig. 2, it will be seen that the thrust pin or detent 10 normally bears frictionally against the inner face of the flange 13 of the collar 12, and the purpose of said thrust pin or detent is to exert sufficient frictional resistance against the collar to prevent free rotary movement thereof and thus cause the collar 12, to be retained in the particular position in which it may be set.

As will be seen by referring to the drawings, the shank 7, of the tool is provided at its base with a contracted neck portion 18ª, there being an annular shoulder 19, at the inner end of the shank 7, adjacent said neck with which the locking lug 15, coöperates to prevent removal of the tool shank 7, from the socket 3, when the locking lug 15, on the annular member is out of alinement with the longitudinal groove 6 formed in the shank 7, of the tool, it being understood that said longitudinal groove 6, opens through or intersects the wall of the annular shoulder 19.

When it is desired to insert a tool within the socket 3, the tool retaining device which comprises the annular member described, is rotated so as to bring the stop 17, into engagement with the stop 18, which will result in positioning the locking lug 15 in alinement with the key 5. The tool shank 7, may then be inserted into the socket 3, it being understood that the key 5, fits into the longitudinal groove or key-way 6 and serves to prevent rotary movement of the tool shank 7, relatively to the socket head. The annular member is then rotated any desired distance so as to separate the stops 17 and 18, and take the locking lug 15 out of alinement with the longitudinal groove 6, in the shank 7, and bring it behind the wall formed by the shoulder 19, and, inasmuch as rotation of the annular tool retaining member 12, moves said member longitudinally upon the head 2, by reason of the complementary threads on said members, the locking lug 15, will be brought to bear against the shoulder 19, which serves to force the shank 7, firmly into locking engagement with the socket 3.

We prefer to make the stop lug 17 on the annular member 12 sufficiently long so that it will engage the stop 18, on opposite sides when said member is given a complete rotation, notwithstanding the fact that said annular member is moved longitudinally along the head 2, during its rotation. This construction will prevent complete removal of the annular member from the head 2, and avoid accidental loss thereof. When it is desired to remove the annular member from the head 2, the stop screw 18, may be removed which will permit free unlimited rotation of the annular member.

In order to assist in removing the tool from the socket in case the shank 7, should become too firmly seated therein, we have provided an improved form of drift-pin shown more clearly in Figs. 2 and 6. This drift-pin comprises a longitudinally movable pin 20, loosely mounted in a transverse aperture formed through the head 2, at the base thereof and which aperture intersects the bore or socket 3 in the head, the pin being provided intermediate its ends with a reduced portion 21, Fig. 6, and an inclined portion 22, the said inclined portion being adapted to engage the end of the tool shank 7, when the pin is moved in the direction of its length by any suitable instrument, such as a hammer, which tends to loosen the tool in its socket by forcing the same forwardly for a slight distance. The said pin 20, as stated, has a free longitudinal movement transversely of the head 2, and is retained from loss or accidental removal from the head, by means of a key 23, which passes through the head at right angles to the pin 20, and which key lies parallel with and closely adjacent the reduced portion 21 of the pin so as to prevent rotation thereof. The pin is further provided at one end with a head 24, designed to receive the impact of the hammer or other tool employed in moving the same longitudinally.

We have shown and described herein a preferred form of the invention, but we do not wish to be understood as limiting ourselves to the precise details of construction, except as we may be limited by the terms of the following claims, as we are aware that slight alterations may be made without departing from the true spirit of the invention.

What we claim is:—

1. A boring bar, comprising a socket-head having a tool shank engaging key projecting into the bore thereof, and an annular tool-retaining member rotatably mounted on said head, said annular member having a tool-engaging lug, extending into the path of said bore and adapted to be moved into and out of alinement with the key.

2. A boring bar, comprising a socket-head, having a key projecting into the bore thereof, a tool retaining member having a rotary and longitudinal movement relatively to said head, said member having a tool engaging lug extending into the path of said bore and adapted to be moved into and out of alinement with the key, and stop means for limiting the rotary movement of the said member.

3. A boring bar, comprising a socket-head having a key projecting into the bore thereof, a tool retaining collar having threaded engagement with said head and rotatable relatively thereto, said collar having an inwardly extending tool-engaging lug adapted to be brought into and out of alinement with the key in the bore, and stop means on the collar and head respectively for limiting the rotary movement of the collar.

4. A boring bar, comprising a socket-head having a key projecting into the bore thereof, an annular tool-retaining member rotatably mounted upon said head and having a laterally projecting tool engaging lug adapted to be brought into and out of alinement with the key in the bore, a stop on the annular member opposite the corresponding lug on said member, and a stop on the head opposite the said key in the bore, as and for the purpose described.

5. A boring bar comprising a socket-head having a key projecting into the bore thereof, a tool retaining collar having threaded engagement with said head and rotatable relatively thereto, said collar having an inwardly turned flange and a tool engaging lug adapted to be moved into and out of alinement with the key in the bore, and stop means on the collar and head respectively for limiting the rotary movement of the collar.

6. A boring bar, comprising a head provided with a socket to receive a tool-shank, a key projecting into said socket, an annular tool retaining member rotatably mounted on said head, said annular member having a laterally projecting tool engaging lug adapted to be moved into and out of alinement with the key in said socket, and stop means for limiting the rotative movement of the annular member relatively to the head.

7. A boring bar, comprising a head provided with a socket to receive a tool-shank, an annular tool retaining member rotatably mounted on said head, said annular member having a laterally projecting tool-engaging lug, and a detent for resisting free movement of the annular member.

8. A boring bar, comprising a head provided with a socket to receive a tool-shank, an annular tool retaining member rotatably mounted on said head, said member having an inwardly turned flange and a tool engaging lug, and a yielding detent pin normally engaging said flange to resist free turning movement of the annular member.

9. A boring bar, comprising a head provided with a socket to receive a tool shank, a collar having threaded engagement with the head and rotatable relatively thereto, said collar having an inwardly turned flange and a tool-engaging lug, and said head having a longitudinal bore, and a thrust-pin yieldingly supported in said bore and having its outer end normally in engagement with the flange on the collar to resist free turning movement of the latter.

In testimony whereof we have hereunto set our hands in the presence of two subscribing witnesses.

ORA B. MUELLER,
ADOLPH MUELLER,
*Executors of the last will and testament of H. Mueller, deceased.*

ANTON C. SCHUERMANN.

Witnesses:
　LEONARD F. McKIBBEN,
　WILLIAM R. BIDDLE.